(No Model.) 5 Sheets—Sheet 1.
J. A. McKENZIE.
Tricycle.
No. 242,212. Patented May 31, 1881.
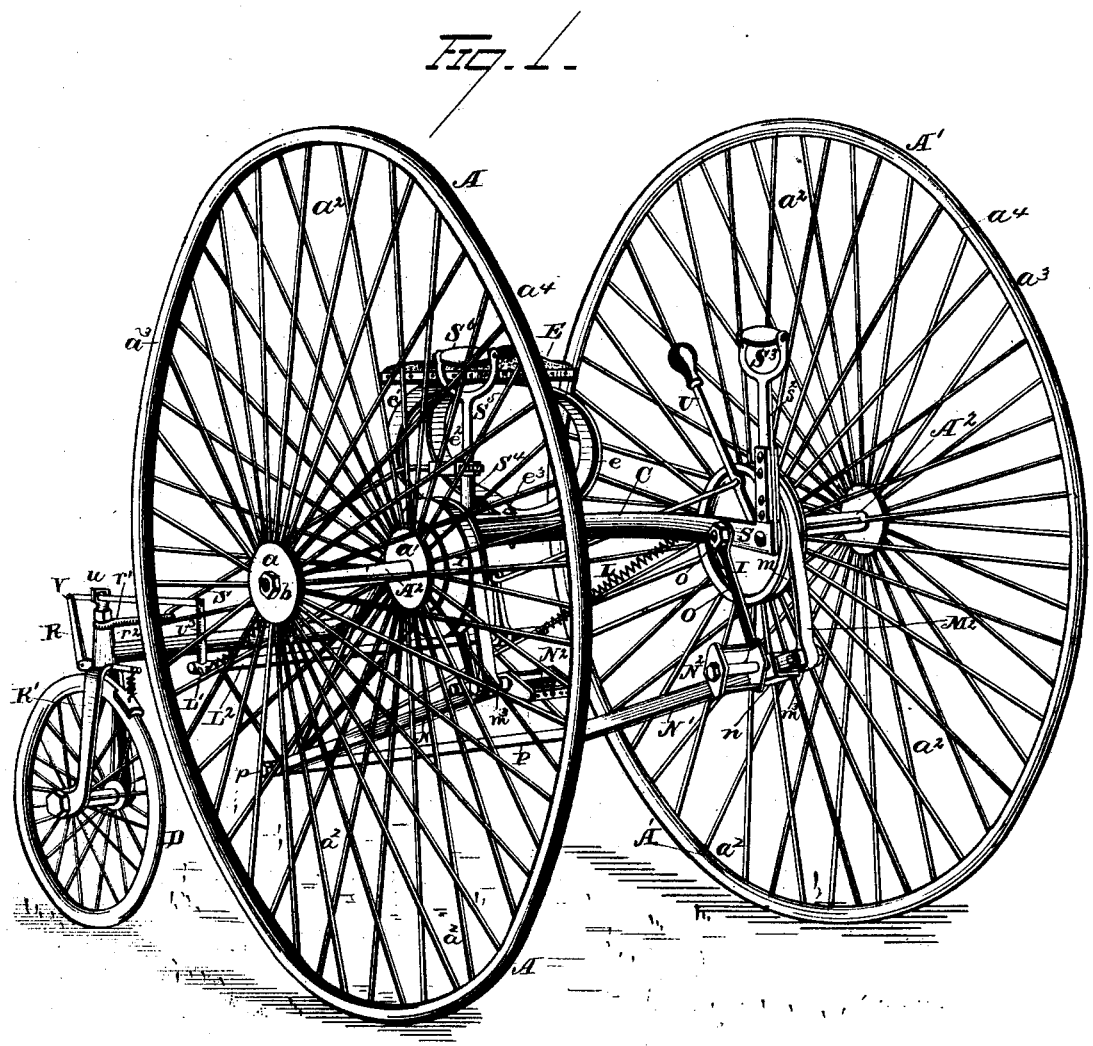
WITNESSES
Herman Moran.
A. M. Bright
INVENTOR
James A. McKenzie.
B. F. A. Seymour.
ATTORNEY (No Model.) 5 Sheets—Sheet 2.
J. A. McKENZIE.
Tricycle.
No. 242,212. Patented May 31, 1881.
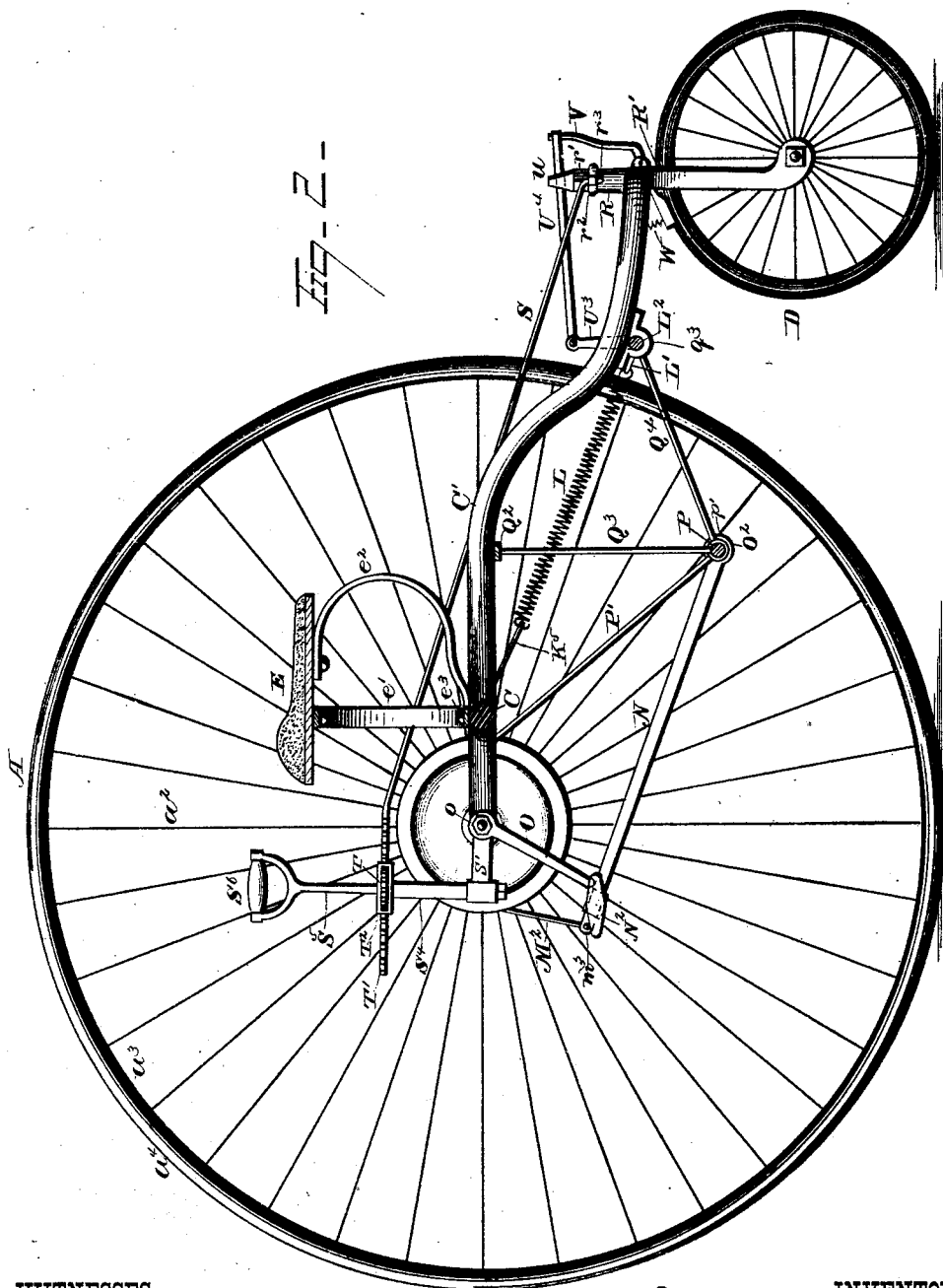
WITNESSES
INVENTOR
James A. McKenzie
ATTORNEY (No Model.)  5 Sheets—Sheet 3.
J. A. McKENZIE.
Tricycle.
No. 242,212.  Patented May 31, 1881.
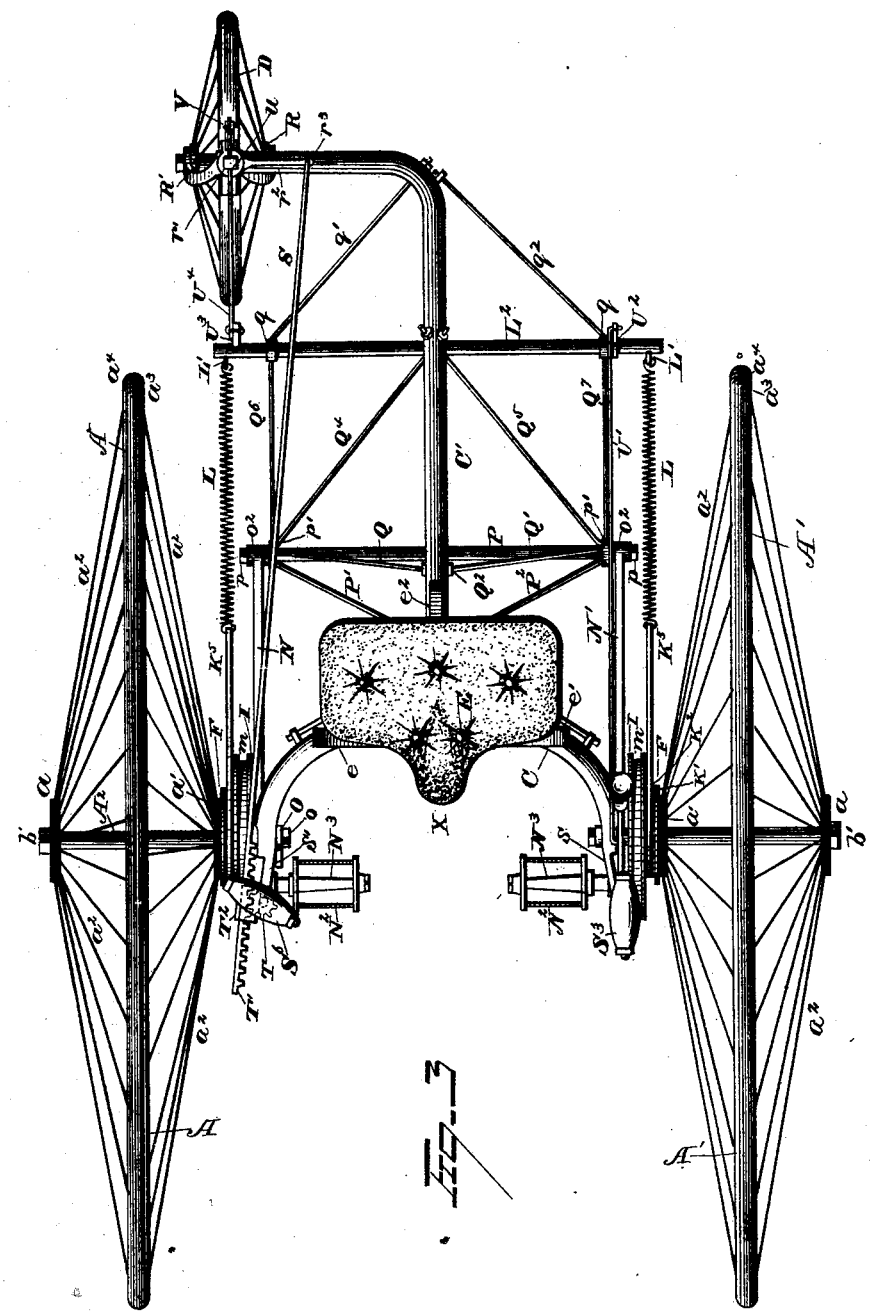
WITNESSES
E. L. Nottingham
Herman Moran
INVENTOR
James A. McKenzie
B. H. A. Seymour.
ATTORNEY (No Model.)
5 Sheets—Sheet 4.
J. A. McKENZIE.
Tricycle.
No. 242,212.
Patented May 31, 1881.
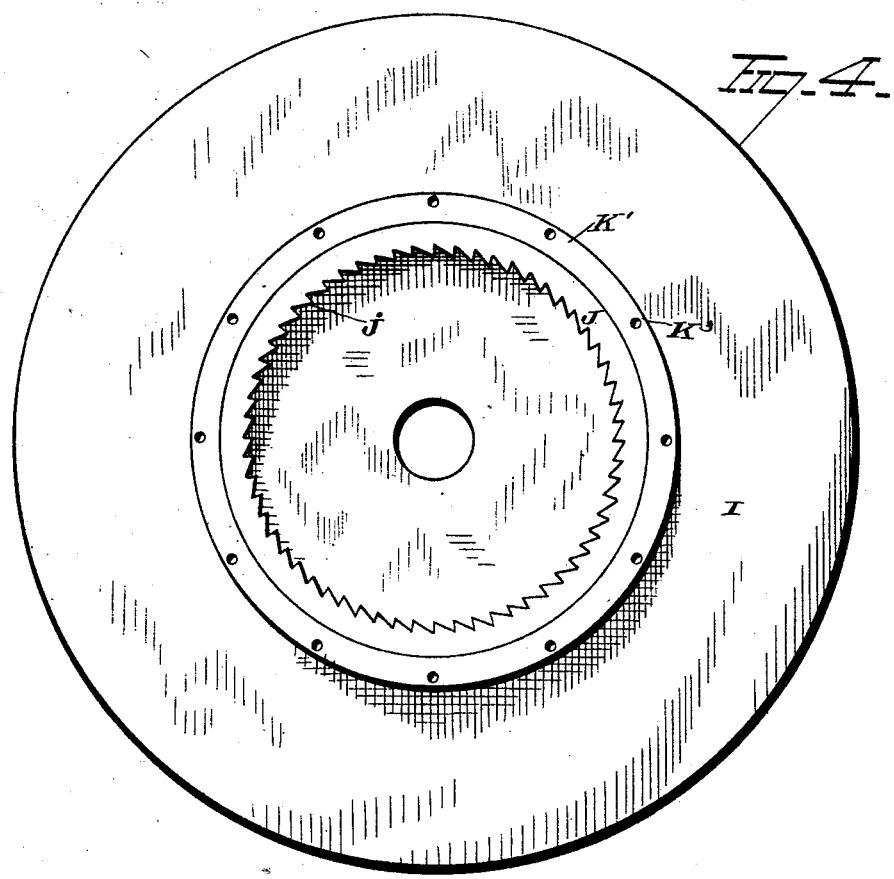
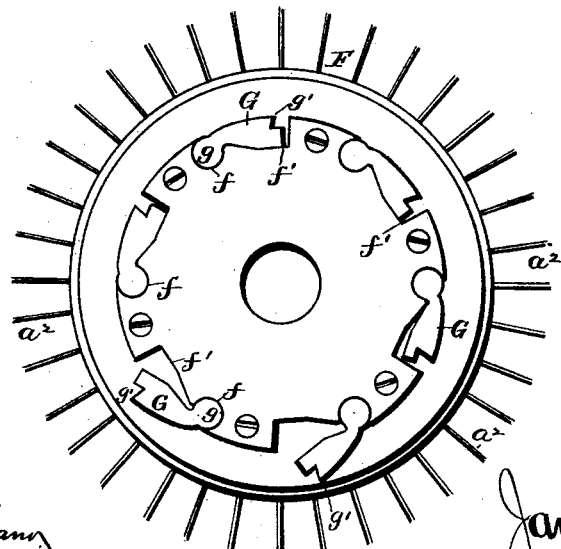
WITNESSES
INVENTOR
ATTORNEY (No Model.)
J. A. McKENZIE.
Tricycle.
No. 242,212. Patented May 31, 1881.
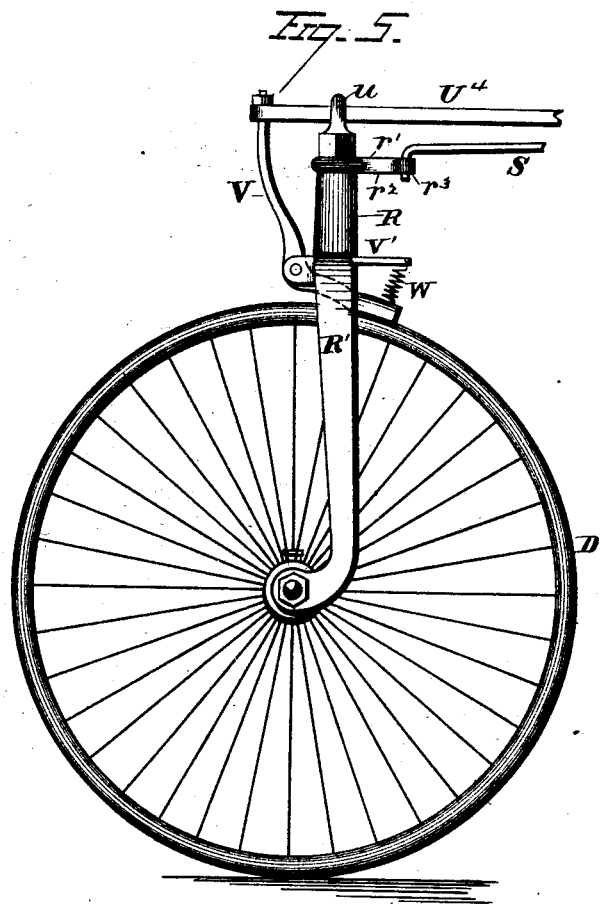
WITNESSES
INVENTOR

UNITED STATES PATENT OFFICE.

JAMES A. McKENZIE, OF GALESBURG, ASSIGNOR TO ALBERT H. OVERMAN, OF CHICAGO, ILLINOIS.

TRICYCLE.

SPECIFICATION forming part of Letters Patent No. 242,212, dated May 31, 1881.

Application filed April 6, 1881. (No model.)

*To all whom it may concern:*

Be it known that I, JAMES A. MCKENZIE, of Galesburg, in the county of Knox and State of Illinois, have invented certain new and useful Improvements in Tricycles; and I do hereby declare the following to be a full, clear, and exact description of the invention, such as will enable others skilled in the art to which it pertains to make and use it, reference being had to the accompanying drawings, which form part of this specification.

My invention relates to an improvement in tricycles, the object being to provide a tricycle of such construction that the weight of the rider shall be disposed in such a manner relative to the large forward wheels and rear guiding-wheel that the minimum resistance and friction will be imposed upon the propelling devices, whereby the vehicle shall be adapted to be driven at a high rate of speed with a slight expenditure of power.

A further object of my invention is to arrange the rider's seat and propelling mechanism in such a manner that the power may be applied in a direct and natural manner, without offering any obstruction to the rider in mounting or dismounting from the vehicle.

A further object of my invention is to provide simple and efficient means for guiding and braking the vehicle.

With these several ends in view, my invention consists in certain features of construction and arrangement of parts in a tricycle, as will hereinafter be described, and pointed out in the claims.

In the accompanying drawings, Figure 1 is a view in perspective of my improvement in tricycles. Fig. 2 is a vertical section. Fig. 3 is a plan view. Fig. 4 is a detached view of the pawl-and-ratchet propelling devices, and Fig. 5 is a detached view of the rear steering-wheel.

A A' represent the large forward wheels, which may be of any approved construction, but those illustrated in the drawings are considered as being well adapted for the desired purpose. These wheels are each composed of an axle-box, $A^2$, upon the opposite ends of which are rigidly secured or formed integral therewith the hub-sections $a\ a'$, into which are inserted and secured the inner ends of the inner and outer series of light steel-wire spokes, $a^2$, the outer ends of which are secured to the rim $a^3$ of the wheel, said rim $a^3$ having a rubber tire, $a^4$, secured therein.

Wheels A A' are mounted on the separate and independent spindles, and are secured thereto by nuts $b\ b'$. The inner ends of spindles are rigidly secured to the opposite ends of the curved or bow-shaped connecting piece or frame C, which latter may be made of wood or metal, and if desired a hollow metal frame or a metal frame made U-shaped in cross-section may be employed.

C' is a reach, the forward end of which is rigidly secured to the central portion of the bow-shaped connecting-piece C. The rear end of the reach is curved at right angles to its length, and has the guiding-wheel D swiveled thereto, as will hereinafter be explained.

Instead of making the curved piece C and reach C' in two parts and securing them together, as described, they may be made of two pieces of bent wood, each extending from the spindles rearward to the guiding-wheel, and securely fastened together at different points from their point of intersection to their rear ends.

Instead of curving the rear end of the reach laterally, as shown, it may be made straight and the guide-wheel located midway between the tracks of the two large forward wheels, A A'. A seat, E, is supported upon the three springs $e\ e'\ e^2$, the lower ends or portions of which are seated upon the reach and bow-shaped piece at their points of intersection, and secured in place by bolts or rivets $e^3$.

Upon the inner face of each inner hub-section, $a'$, of the forward wheels, A A', is secured a ring or disk, F, having circular openings $f$ and cut-away portions $f'$ formed in its periphery. Within the circular openings $f$ are placed the round pivotal ends $g$ of the pawls G, the free ends, $g'$, of said pawls being received in the cut-away portions $f'$. It will thus be perceived that the pawls are secured in place without the aid of rivets, and are free to swing outward and inward according to the position of the wheel.

To the inner face of the ring or disk, or the inner hub-section of each wheel, is secured a short thimble or sleeve bearing, upon which is loosely mounted the disk I, which latter is provided with an internal ratchet-gear, J, that fits over the pawl disk or ring F, the construction and arrangement of parts being such that one or more pawls G will engage with the teeth $j$ of ratchet J when the disk I is rotated forwardly, and when the disk is rotated in the opposite direction the pawls will ride over the ratchet-teeth.

Disks I are each provided with an outwardly-projecting annular bearing or ring having a flange, K', thereby forming a groove, $K^2$, on the outer face of said disk. The flange K' is provided with any desired number of holes, $K^3$, in any one of which is secured a hook attached to the strap or cord $K^5$, the other end thereof being secured to one end of a spiral spring, L, the latter being secured at their opposite ends to hooks L' on the opposite ends of the combined rock-shaft and brace-rod $L^2$.

Upon the peripheries of the disks I are formed grooves M, which are provided with one or more holes for the insertion of hooks attached to the ends of the straps $M^2$, the opposite ends of which are secured to pins $M^3$ on the forward ends of the treadles N N'. Straps $M^2$ may be made of wire, ribbon-steel, chain, or other material, as desired.

$N^2$ are foot-pedals, of any approved construction, swiveled upon the bars $N^3$, the latter being furnished with a square sleeve, $n$, which fits the end of the treadle and is secured in place by a set-screw.

To the inner ends of the spindles are secured the upper ends of the depending arms O, the latter having an eye formed in its upper end, enabling it to be slipped upon the end of the spindle and secured thereto by the nut $o$. The lower ends of the arms O are provided with laterally-projecting stops, which are located over the outer or forward ends of the treadles, and serve as stops to limit the upward throw of the treadles.

The treadles N N' are each provided on their rear ends with tubular bearings $o^2$, which are journaled upon the opposite ends of the rod or bar P and secured in place by the nuts $p$. The inner ends of the bearings $o^2$ abut against the collars $p'$ secured to the rod P, whereby said treadles are retained against displacement. Rod or bar P is firmly braced by the crossed braces P' $P^2$, the lower ends of which are secured to collars $p'$, while their upper and screw-threaded ends extend through the eye-bolts or fastenings secured to the curved connecting-piece C and are adjustably secured by nuts.

Upright diverging braces Q Q' are secured at their lower ends to the collars $p'$, and at their upper ends to a curved metal bearing, $Q^2$, attached to the central portion of the reach. A vertical brace, $Q^3$, is secured at its lower end to the central portion of the rod P, and at its upper end to the metal bearing $Q^2$. Rearwardly-inclined diverging braces $Q^4$ $Q^5$ are secured at their lower ends to collars $p'$ and at their upper ends to the rear portion of the reach. Also, braces $Q^6$ $Q^7$ are secured at their lower ends to collars $q$, sleeved upon the rock-shaft $L^2$, the latter being braced by the rods $q'$ $q^2$, secured at their forward ends to the collars $q$ and at their rear ends to the reach.

Rock-shaft $L^2$ is mounted in a bearing, $q^3$, attached to the under side of the reach. To the rear end of the reach is fastened a sleeve, R, in which is received the spindle of the guide-wheel yoke R'. The upper end of the spindle is formed square or of other angular shape, and has fitted thereto the square or angular socket $r'$, formed on one end of the arm $r^2$, the opposite end of which is provided with an eye, $r^3$, in which is inserted the rear end of the guiding-rod S.

The opposite ends of the curved or bow-shaped connecting-piece C extend in front of the spindles, as shown at $s$ $s'$. To one of these projecting ends, $s$, is rigidly secured the handle arm or standard $S^2$, any suitable form of handle, $S^3$, being attached to the upper end of the arm. Upon the end of the other projecting portion, $s'$, is formed a sleeve, $S^4$, in which is inserted the handle arm or standard $S^5$, provided with a handle, $S^6$, said handle arm or standard being free to revolve in said sleeve. To the standard $S^5$ is secured a toothed wheel or pinion, T, which engages with a rack-bar, T', formed on the forward end of the guiding-rod S. Rack-bar T' is retained in engagement with the pinion by means of a sheath, $T^2$, connected with the standard, and through which the rack-bar has endwise movement.

To the projecting end $s$ is pivoted a brake-lever, U, to which is pivoted the forward end of a connecting-rod, U', the rear end of which is attached to an arm, $U^2$, rigidly secured to the rock-shaft $L^2$.

To an arm, $U^3$, secured to the opposite end of the rock-shaft, is secured the forward end of a flexible metal strap or chain, $U^4$, the rear end passing through a guide, $u$, and attached to the upright arm V of a bell crank-lever pivoted to the upper end of the yoke of the guide-wheel. The other arm, V', of the bell-crank lever is formed into a brake-shoe, and is retained in its raised position clear from the tire of the guide-wheel by means of the spiral spring W.

By forcing the brake-lever U forward, the rock-shaft $L^2$ is partly rotated and the brake-shoe depressed, thus quickly arresting the movement of the vehicle. The flexible connection $U^4$ allows the brake to be operated irrespective of the position of the guide-wheel.

By rotating the handle $S^5$ the guiding-wheel is easily and quickly turned either to the right or left, thereby enabling the tricycle to be steered with little effort or power.

It will be observed that an open and unobstructed space, X, is provided between the inner ends of the spindles of the large front wheels, within which a person may enter in mounting the seat. In mounting the feet are placed on the foot-pedals and the body raised to the seat, and owing to the fact that the weight of the rider, either in mounting or propelling the vehicle, is disposed upon the forked-shaped frame at a point slightly in rear of the spindles, the vehicle is prevented from tipping over forward or causing a "header" while the machine is in motion. Should any serious obstruction be met with by the rider, little or no danger of any injury can result from the possible upsetting of the machine, as the feet of the rider are but slight distance from the ground, and as there is nothing to obstruct the rider's exit from the front of the machine, dismounting is rendered quick, easy, and safe.

By the employment of the ratchet-and-pawl propelling devices, in the manner shown and described, the legs of the rider are free to move up and down opposite the inner faces of the disks, and an easy and natural motion of the limbs is resorted to in propelling the machine.

The foot-pedals are depressed alternately. When one is being depressed, the weight is thrown thereon and operates to propel the machine, while the weight is removed from the other pedal, and the spring serves to reverse the disk and raise the foot-pedal for the next succeeding stroke.

I am aware that it is old to actuate a tricycle by means of a crank-shaft located between the front wheels, and hence I would have it understood that I make no claim to such an arrangement of parts. In the event of the employment of a crank-shaft between the front wheels, it is impossible to secure an unobstructed space between the front wheels, as in my improvement, wherein the foot-treadles are connected with the pawl-and-ratchet drive mechanism combined with the front wheels. I am also aware that it is old, broadly speaking, to actuate a tricycle by means of pawl-and-ratchet mechanism, foot-treadles, and flexible straps; and hence I make no broad claim to such devices irrespective of their arrangement or connection with the wheels.

It is evident that many slight changes in the construction and relative arrangement of parts might be resorted to without departing from the spirit of my invention. As heretofore stated, the guiding-wheel may be located in rear of and equidistant between the two large front wheels. The bracing-rods may be varied in number, shape, and location. The pawl-and-ratchet mechanism may be varied in many respects; also, different forms of steering and braking devices may be used. Hence I would have it understood that I do not restrict myself to the exact construction and arrangement of parts shown and described; but Having fully described my invention, what I claim as new, and desire to secure by Letters Patent, is—

1. In a tricycle, the combination, with two large front wheels and a small rear steering-wheel, of treadles and devices connected to the inner ends of the front-wheel hubs and adapted to be locked thereto and disengaged therefrom, for propelling the vehicle, the parts being constructed to form an unobstructed space between the foot-pedals and front-wheel spindles, substantially as set forth.

2. In a tricycle, the combination, with two front wheels mounted on separate spindles attached to the opposite ends of a connecting-piece extending rearwardly of said spindles, of devices connected to the front-wheel hubs and foot-treadles for propelling the tricycles through the medium of said devices, the parts being constructed and arranged to form an open and unobstructed space between the foot-pedals and front-wheel spindles, substantially as set forth.

3. In a tricycle, the combination, with the two front wheels and a seat located in rear of the front-wheel spindles, of foot-pedals located in front of the spindles and devices connected therewith and adapted to be engaged with and disengaged from the inner ends of the front-wheel hubs and revolve the wheels, the several parts being arranged, substantially as shown and described, to form an unobstructed space between the foot-pedals and the front-wheel spindles, substantially as set forth.

4. In a tricycle, the combination of the two front wheels and a seat-supporting frame having the front-wheel spindles attached thereto, said supporting-frame at its forward end being arranged practically in the same horizontal plane as the front-wheel spindles, and formed to insure an unobstructed space between said spindles, and foot-pedals located below and in front of said spindles, substantially as set forth.

5. In a tricycle, the combination, with two large front wheels mounted on independent spindles and a rearwardly-curved connecting-piece having the front-wheel spindle secured to its opposite ends, of foot-treadle levers pivoted in rear of the front-wheel spindles, and provided with foot-pedals located below and in front of said spindles, pawl-and-ratchet propelling devices connected with the inner ends of the front-wheel hubs, and flexible straps connecting the foot-treadles and pawl-and-ratchet propelling devices, substantially as set forth.

6. In a tricycle, the combination, with the two large front wheels mounted on separate spindles rigidly secured to the opposite ends of a rearwardly-curved connecting-piece, of loosely-mounted disks located between the ends of the curved connecting-piece and wheels, pawl-and-ratchet mechanism for locking the disks to the wheel when the disks are rotated in one direction, and springs for rotating the disks in the opposite direction, substantially as set forth.

7. In a tricycle, the combination, with two front wheels and a rear steering-wheel, of pawl-and-ratchet drive mechanism connected with the inner ends of the hubs of the front wheels, and foot-pedals located below and in front of the front-wheel spindles and projecting inwardly therefrom, the parts being arranged to form an unobstructed space between the foot-treadles and spindles, substantially as set forth.

8. In a tricycle, the combination, with two large front wheels, a small rear steering-wheel, a forked-shaped frame connecting said wheels, and a seat mounted on the connecting-frame and located between the front wheels, of pawl-and-ratchet driving mechanism connected with the inner ends of the hubs of the front wheels, and separate and independent foot-pedals located below and in front of the front-wheel spindles, the parts being constructed to form an open unobstructed space in front of the seat and between the foot-pedals, substantially as set forth.

9. In a tricycle, the combination, with the two large front wheels and rearwardly-curved connecting-piece, having its opposite ends secured to the front-wheel spindles, of depending arms provided with stops to limit the upward movement of the treadles, substantially as set forth.

10. In a tricycle, the combination, with two large front wheels, small rear steering-wheel, and forked-shaped frame connecting said wheels, of ratchet-and-pawl drive mechanism connected to the inner ends of the front-wheel hubs, and treadles pivoted to the opposite ends of a bar or rod suspended from the reach portion of the frame, substantially as set forth.

11. In a tricycle, the combination, with disks located between the front wheels and opposite ends of the curved connecting-frame, of a cross-bar connected to the reach and springs, and flexible straps connecting said disks and opposite ends of the cross bar, substantially as set forth.

12. In a tricycle, the combination, with the steering-wheel, having an arm secured to its spindle, of a rotating handle-shaft, provided with a pinion, and a connecting-rod, having a rack-bar on its forward end, substantially as set forth.

13. In a tricycle, the combination, with the two large front wheels, of a rearwardly-curved connecting-piece, having the front-wheel spindles secured thereto, the ends of said connecting-piece extending in front of the spindles, and having handles connected thereto, substantially as set forth.

In testimony that I claim the foregoing I have hereunto set my hand this 2d day of April, 1881.

JAMES A. McKENZIE.

Witnesses:
WILLIAM J. MARTIN,
ALBERT H. OVERMAN.